(12) United States Patent
Singh et al.

(10) Patent No.: US 8,848,504 B2
(45) Date of Patent: Sep. 30, 2014

(54) DSL ALIEN NOISE REDUCTION

(75) Inventors: Shailendra K. Singh, Fremont, CA (US); Kevin D. Fisher, Palo Alto, CA (US)

(73) Assignee: Ikanos Communications, Inc., Fremont, CA (US)

( * ) Notice: Subject to any disclaimer, the term of this patent is extended or adjusted under 35 U.S.C. 154(b) by 308 days.

(21) Appl. No.: 13/273,916

(22) Filed: Oct. 14, 2011

(65) Prior Publication Data

US 2012/0093241 A1  Apr. 19, 2012

Related U.S. Application Data

(60) Provisional application No. 61/393,756, filed on Oct. 15, 2010.

(51) Int. Cl.
*H04M 1/74* (2006.01)
*H04B 3/32* (2006.01)
*H04B 15/00* (2006.01)

(52) U.S. Cl.
CPC . *H04B 15/00* (2013.01); *H04B 3/32* (2013.01)
USPC ............ 370/201; 370/286; 370/351; 370/352

(58) Field of Classification Search
USPC ......... 370/201, 286, 351, 352, 252, 432, 464; 375/222, 257, 225, 231; 379/402, 413
See application file for complete search history.

(56) References Cited

U.S. PATENT DOCUMENTS

| | | | |
|---|---|---|---|
| 6,317,495 B1 | 11/2001 | Gaikwad et al. | |
| 6,463,041 B1 * | 10/2002 | Agazzi | 370/286 |
| 7,020,212 B1 * | 3/2006 | Strait | 375/260 |
| 7,177,350 B1 * | 2/2007 | Long et al. | 375/222 |
| 7,315,592 B2 * | 1/2008 | Tsatsanis et al. | 375/346 |
| 7,639,596 B2 * | 12/2009 | Cioffi | 370/201 |
| 7,809,076 B1 * | 10/2010 | Ghobrial et al. | 375/285 |
| 2003/0189998 A1 * | 10/2003 | Phanse et al. | 375/348 |
| 2006/0280238 A1 * | 12/2006 | Cioffi et al. | 375/222 |
| 2008/0160915 A1 * | 7/2008 | Sommer et al. | 455/63.1 |
| 2009/0245340 A1 * | 10/2009 | Sorbara et al. | 375/227 |
| 2009/0257581 A1 * | 10/2009 | Biyani et al. | 379/417 |
| 2010/0135482 A1 * | 6/2010 | Jagannathan et al. | 379/406.06 |
| 2011/0080938 A1 | 4/2011 | Fisher et al. | |

FOREIGN PATENT DOCUMENTS

KR  10-2007-0061746 A   6/2007

OTHER PUBLICATIONS

International Search Report and Written Opinion issued Apr. 17, 2012 for PCT/US2011/056292.

* cited by examiner

*Primary Examiner* — Dang Ton
*Assistant Examiner* — Sai Aung
(74) *Attorney, Agent, or Firm* — Pillsbury Winthrop Shaw Pittman LLP

(57) ABSTRACT

Alien noise is removed from one or more receptor DSL lines after self-FEXT has been eliminated or reduced. Information about the alien noise in the form of slicer errors can be obtained from one or more donor DSL lines that may or may not be in the same domain (e.g., a vectored DSL system).

20 Claims, 11 Drawing Sheets

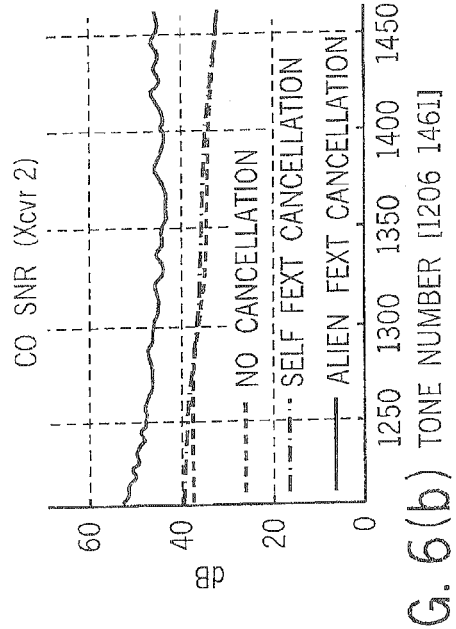
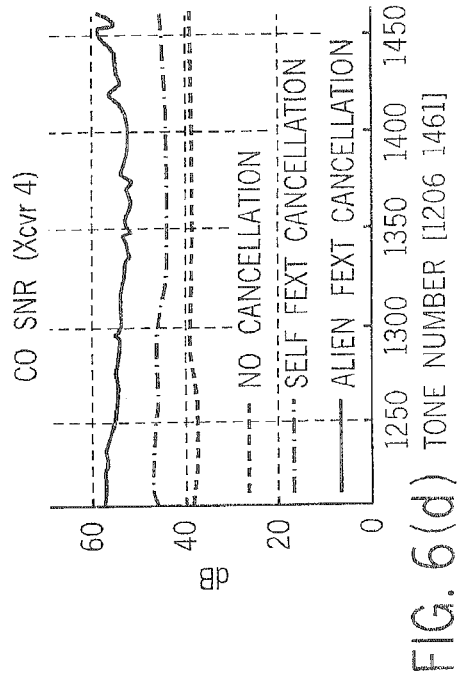
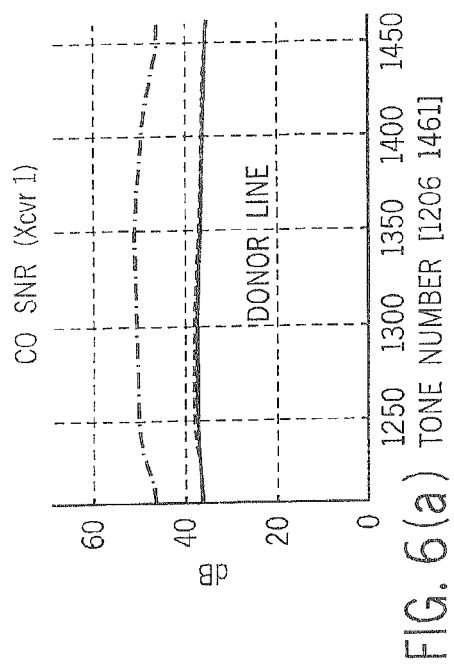
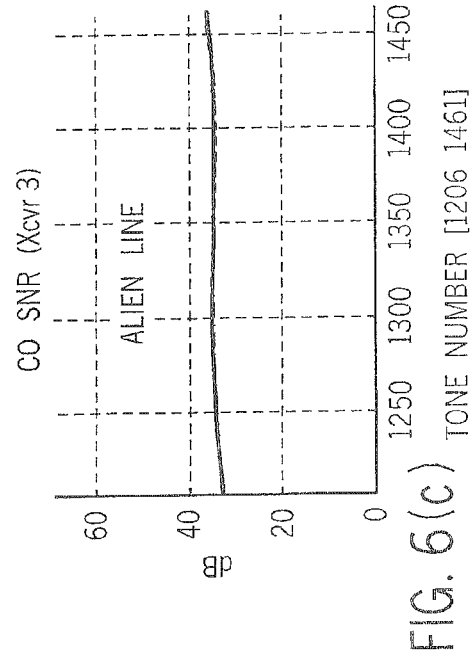

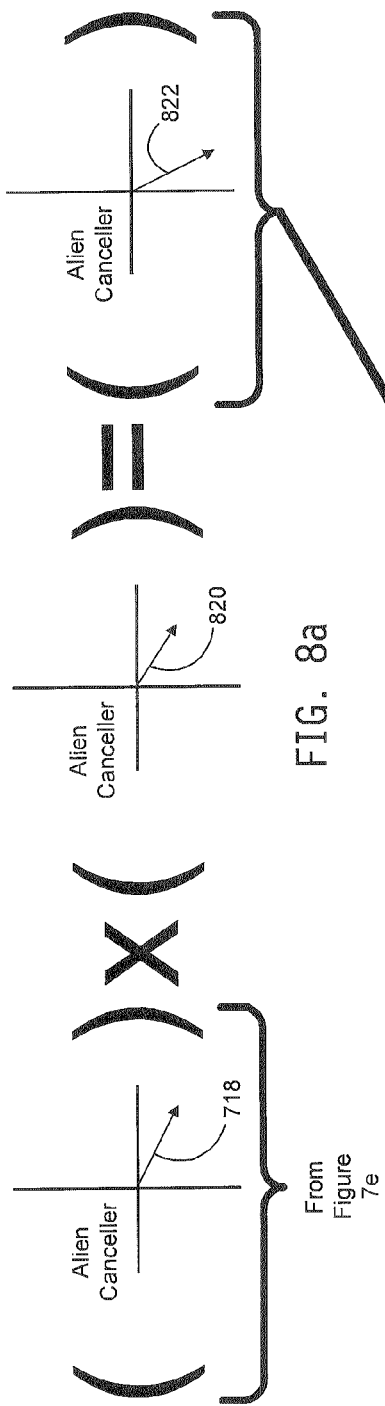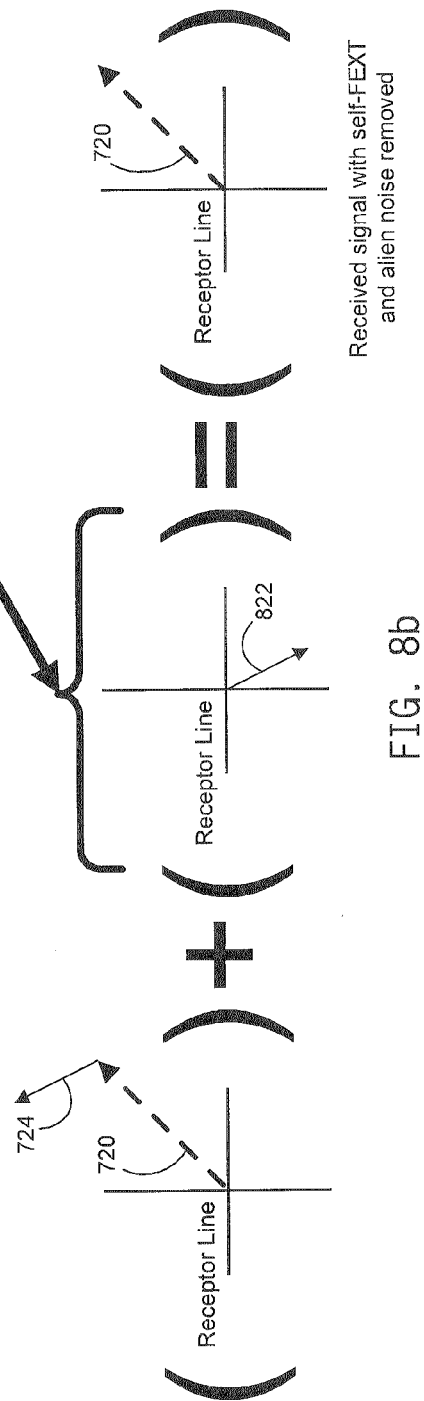

DSL ALIEN NOISE REDUCTION

PRIORITY CLAIM AND CROSS-REFERENCE TO RELATED APPLICATIONS

This application claims priority to and the benefit of the following prior filed application:

U.S. Ser. No. 61/393,756 filed 15 Oct. 2010, entitled SYSTEM AND METHOD FOR ALIEN NOISE CANCELLATION USING DONOR LINES. The entire disclosure of the above-mentioned application is incorporated herein by reference in its entirety for all purposes

TECHNICAL FIELD

The present invention relates generally to the field of DSL communication systems and more particularly to apparatus, systems, methods, etc. pertaining to reducing alien noise effects in a digital subscriber line (xDSL) system such as VDSL.

BACKGROUND

VDSL deployment suffers from various types of interference, noise, etc. These typically have included self-FEXT (i.e., far-end crosstalk generated from within a given domain or group of lines), alien FEXT (from one or more alien noise sources outside the domain), impulse noise, and radio frequency interference (RFI). Self-FEXT has been the dominant problem in such deployments. Using MIMO VDSL vectoring, self-FEXT can be cancelled very effectively. Such self-FEXT cancellation changes the VDSL noise environment substantially, for example by permitting alien noise from outside the system to become more apparent and/or significant. That is, in a generally self-FEXT-free environment, alien noise (e.g., alien FEXT, impulse noise, RFI, etc.) typically become the dominant disturbances limiting system performance. Much of this type of alien noise is from a single source, couples to all lines in a bundle in a similar fashion, and is correlated.

SUMMARY

Embodiments of alien noise reduction herein include apparatus, systems, methods, etc. adapted to remove and/or reduce alien noise in transmitted DSL signals and data. In some embodiments methods include identifying, selecting and/or segregating donor DSL lines in an active DSL line set (e.g., a vectored DSL group, DSL domain, binder, or the like) and receptor DSL lines in the active DSL line set. Self-FEXT cancellation can be performed on all of the DSL signals (also referred to as "DSL data" and other similar terms) to remove and/or reduce self-FEXT interference. The DSL data with self-FEXT removed is then processed depending upon whether the data comes from donor DSL lines or receptor DSL lines. Donor DSL line data is used to generate slicer errors. These donor DSL line slicer errors are then used to perform alien noise reduction in the receptor DSL line data. Various criteria and other processes can be used in selecting donor DSL lines and receptor DSL lines, in performing correlations of various types of data used in such embodiments, etc.

Other embodiments of alien noise reduction include apparatus such as DSL systems that include DSL lines that have upstream ends terminating at line cards (or similar apparatus) in a central office or the like. In some embodiments vectoring chips or other apparatus coupled to and distinct from the line cards can be used to perform self-FEXT cancellation of signals/data received on all DSL lines in an active DSL line set. Alien noise reduction is then performed on the line card(s) using slicer errors generated by line card slicers or the like.

Various embodiments include method, apparatus, techniques and the like for creating self-FEXT and alien noise cancellation coefficients (and/or their equivalents), for implementing such coefficients and for updating the coefficients and any other data or means used to perform alien noise reduction. Embodiments of the present invention can be deployed in a variety of communication systems such as VDSL and other systems.

BRIEF DESCRIPTION OF DRAWINGS

The present invention will be readily understood by the following detailed description in conjunction with the accompanying drawings, wherein like reference numerals designate like structural elements, and in which:

FIGS. 5 and 6 are data plot diagrams illustrating one or more embodiments of alien noise reduction.

FIGS. 7 and 8 are constellation diagrams of one or more embodiments of alien noise reduction.

DETAILED DESCRIPTION

Figure 1:
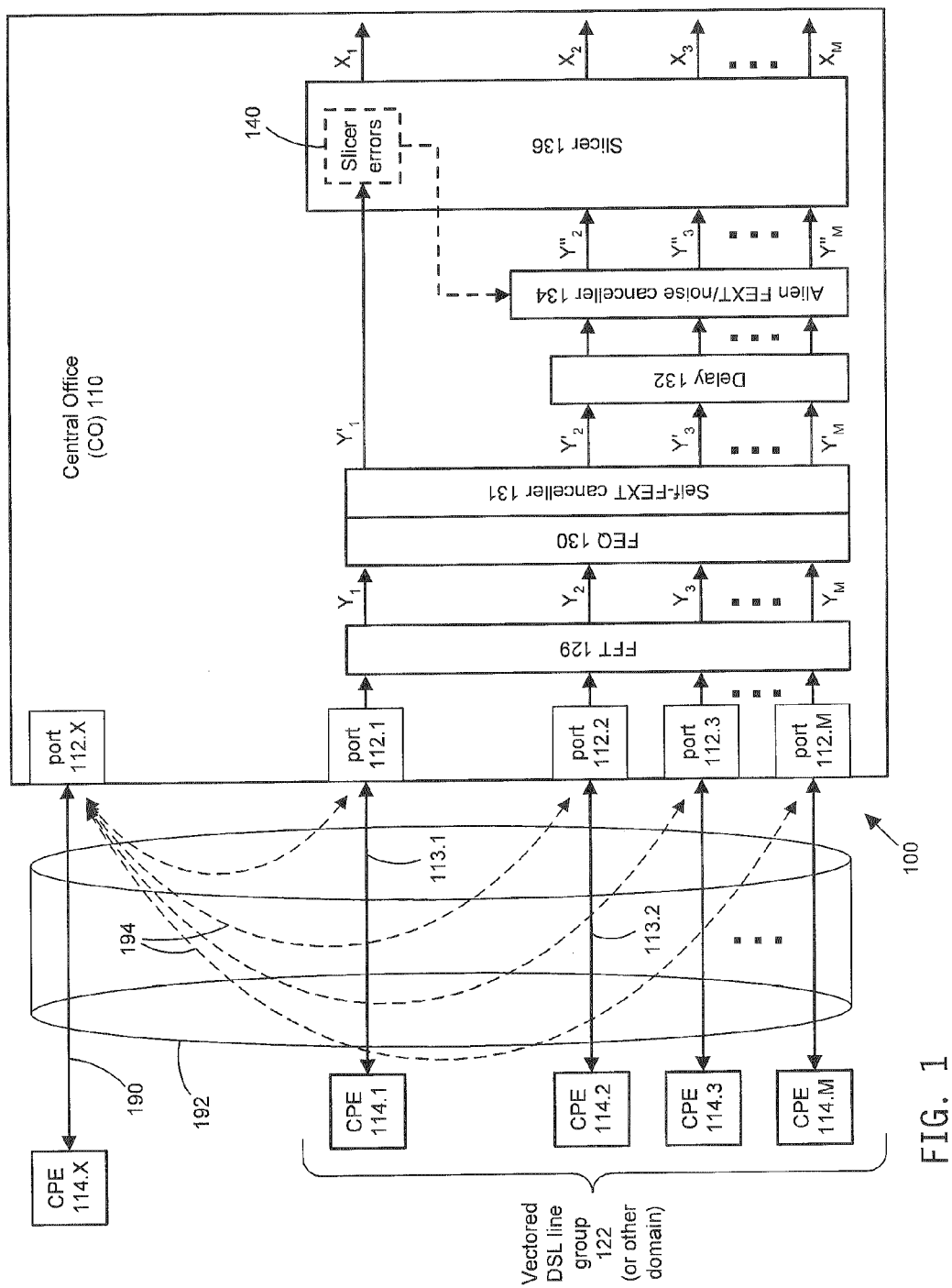
FIGS. 1-4 are a block diagram of a DSL system implementing one or more embodiments of alien noise reduction.

The following detailed description will refer to one or more embodiments, but the present invention is not limited to such embodiments. Rather, the detailed description and any embodiment(s) presented are intended only to be illustrative and to cover all alternatives, modifications, equivalents, etc. included within the spirit and scope of the disclosure as defined by the appended claims. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, components may be referred to in the art by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The terms "chip" and "processor" refer broadly to hardware devices that operate in a prescribed manner, for example to process data, and can include various types of such devices (for example, a field-programmable gate array (FPGA), a digital signal processing (DSP) chip, an application-specific integrated circuit (ASIC), an integrated circuit (IC), etc., as well as more complex devices or combinations of such devices such as computers). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "embodiments," "some embodiments," "one embodiment," "an embodiment," etc. of the present invention means that a particular feature, structure or characteristic described in connection with such embodiment(s) is included in at least one embodiment of the present invention. Thus, the appearances of the noted phrases and the like in various places throughout the specification are not necessarily all referring to the same embodiment.

DSL systems typically use discrete multi-tone (DMT) techniques (e.g., a multi-carrier technique) that divide available bandwidth of twisted-pair copper lines into multiple channels, sub-channels or frequency bins. Using DMT the available bandwidth is broken into sub-channels or tones and data is simultaneously transferred over multiple sub-channels depending upon transmission characteristics of each sub-channel. Frames of a data stream in DMT systems are broken down into data blocks, which are allocated to multiple sub-channels. The signal on a sub-channel, in turn, can be represented as a complex value modulating a carrier whose frequency is the same as the center frequency of the sub-channel. The magnitude and phase of the complex value is based on the data that the sub-channel is carrying and on the number of bits that the sub-channel can support, sometimes referred to as bit-loading. The bit-loading on a given sub-channel is indicative of the number of constellation points (e.g., the number of magnitude and phase combinations of the complex value) that can be transmitted on the sub-channel. Thus, e.g., if the bit-loading of a particular carrier channel is 2, then the number of constellation points is 4, with a constellation point in each quadrant representing the binary number 00, 01, 10, or 11. This process of associating binary numbers to constellation points is sometimes referred to as constellation encoding or constellation mapping. Bits of data are mapped on constellation points of an appropriately sized quadrature amplitude modulation (QAM) constellation. The signals of the plurality of sub-channels are then summed to produce a time domain DMT symbol that is subsequently transmitted over the twisted-pair copper line. That is, each of the carriers that make up the DMT symbol contains a QAM signal. A DMT symbol is generated for each frame of the original data stream.

Some embodiments of alien noise reduction disclosed and claimed herein collect slicer errors from one or more DSL lines (referred to as "donor DSL lines" herein) and use collected slicer errors to calculate cancellation coefficients to reduce such alien noise in other DSL lines (referred to as "receptor DSL lines" herein). In some of these embodiments, donor DSL lines are selected based on various criteria, which can include: correlation of the alien noise between the donor DSL line(s) and the receptor DSL lines, severity of the alien noise's impact on various in-domain DSL lines, whether one or more in-domain DSL lines require alien noise reduction for substantive gains in performance, etc.

In many DSL systems, self-FEXT represents the most significant reducible noise. Once that self-FEXT has been eliminated or significantly reduced, alien noise (e.g., alien FEXT) gains in prominence as a source of performance impairment. Embodiments of alien noise reduction herein can be used to address a variety of alien noise types and sources. For purposes of illustration, alien FEXT is used herein as one example of a typical source of alien noise that negatively impacts performance of DSL systems, including vectored DSL systems and the like.

FIG. 1 illustrates one or more embodiments of an alien noise reduction system 100 that can be implemented using multiple DSL lines 113 in a domain such as a vectored DSL line group 122 and one or more alien noise sources 190 (e.g., in FIG. 1, an alien DSL line 190 in the same binder 192 as vectored group 122 injecting alien FEXT 194 into in-domain DSL lines 113). Lines 113 include CPEs 114.1, 114.2, 114.3, . . . 114.M and all terminate at central office (CO) 110. Each in-domain DSL line 113 includes a twisted pair coupling each CPE unit 114 to a port 112 at the CO 110. Signals received by CO 110 from the in-domain DSL lines 113 are processed, including conversion to the frequency domain by FFT unit 129 and frequency equalization at FEQ 130.

Self-FEXT interference is removed or reduced at self-FEXT canceller 131, which outputs signals Y' for each line's signal. Line 1 (i.e., using CPE 114.1 and port 112.1) of the in-domain DSL lines in FIG. 1 has been selected as a donor DSL line and the output of FEQ 130 from donor DSL line port 112.1 is fed directly to slicer unit 136. Signals corresponding to lines 114.2, 114.3, . . . 114.M (which have already had self-FEXT cancellation performed by self-FEXT canceller 131) are fed to delay unit 132 and then to alien FEXT canceller 134.

A processing unit 140 or other appropriate collection means collects slicer errors from each donor DSL line, in this example the slicer errors from donor DSL line port 112.1. The slicer errors can be collected from sync symbols in some embodiments. Processor 140 sends the collected slicer errors to the alien FEXT canceller 134 to calculate the correlation between alien noise impacting signals received by donor DSL line port 112.1 and any receptor DSL lines 114.2, 114.3, . . . 114.M ("receptor DSL lines" in this illustrative embodiment are the beneficiaries of alien noise reduction). Processor 140 calculates canceller coefficients corresponding to the alien noise interference and supplies those alien noise cancellation coefficients to alien FEXT canceller 134 to be used to reduce alien noise in signals received on receptor DSL lines 114.2, 114.3, . . . 114.M. The receptor DSL line data, now having benefited from both self-FEXT cancellation and alien noise cancellation, can be provided to slicer unit 136 to allow constellation decisions and generation of output data X for demapping or the like.

Figure 2:
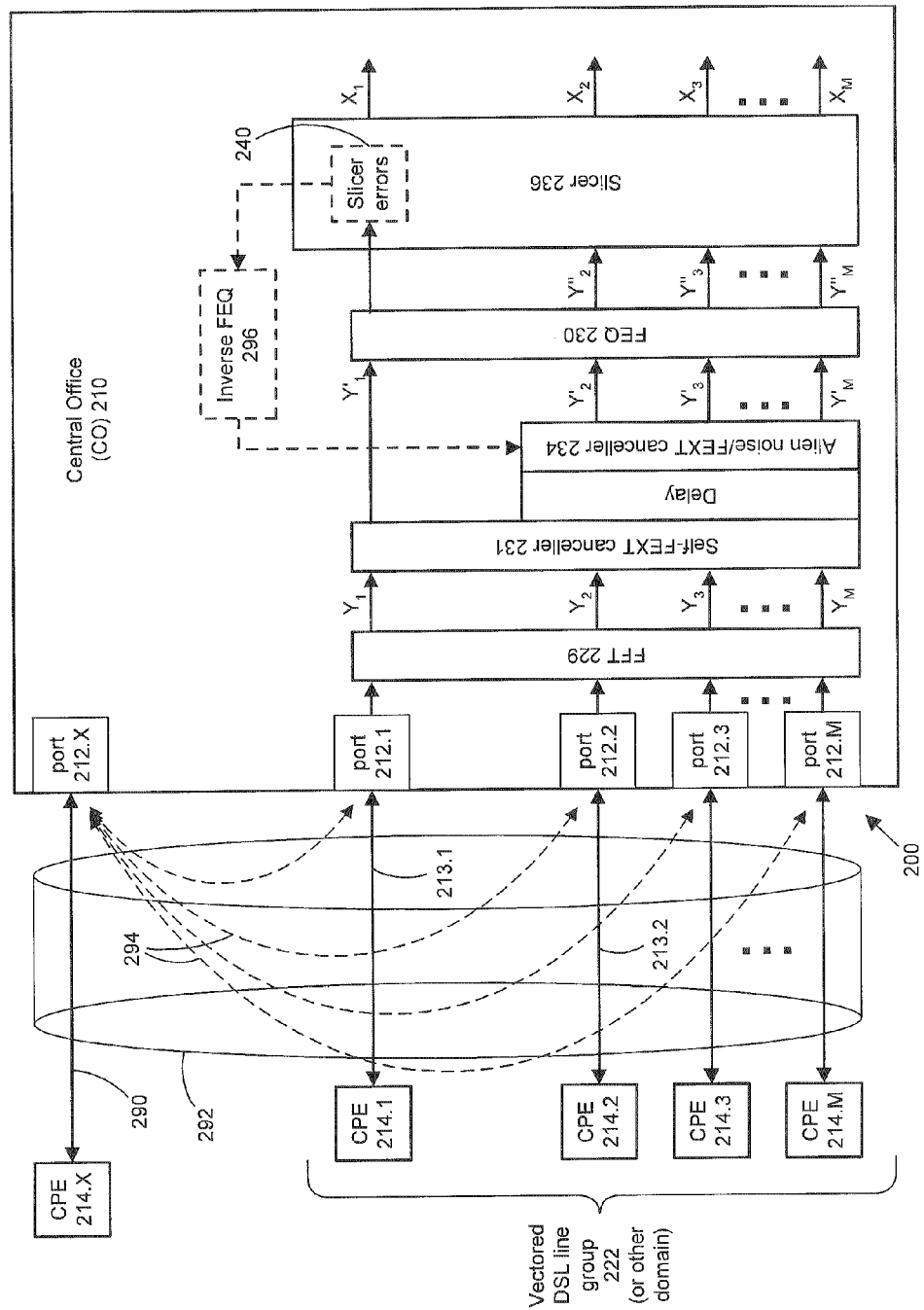
Figure 3:
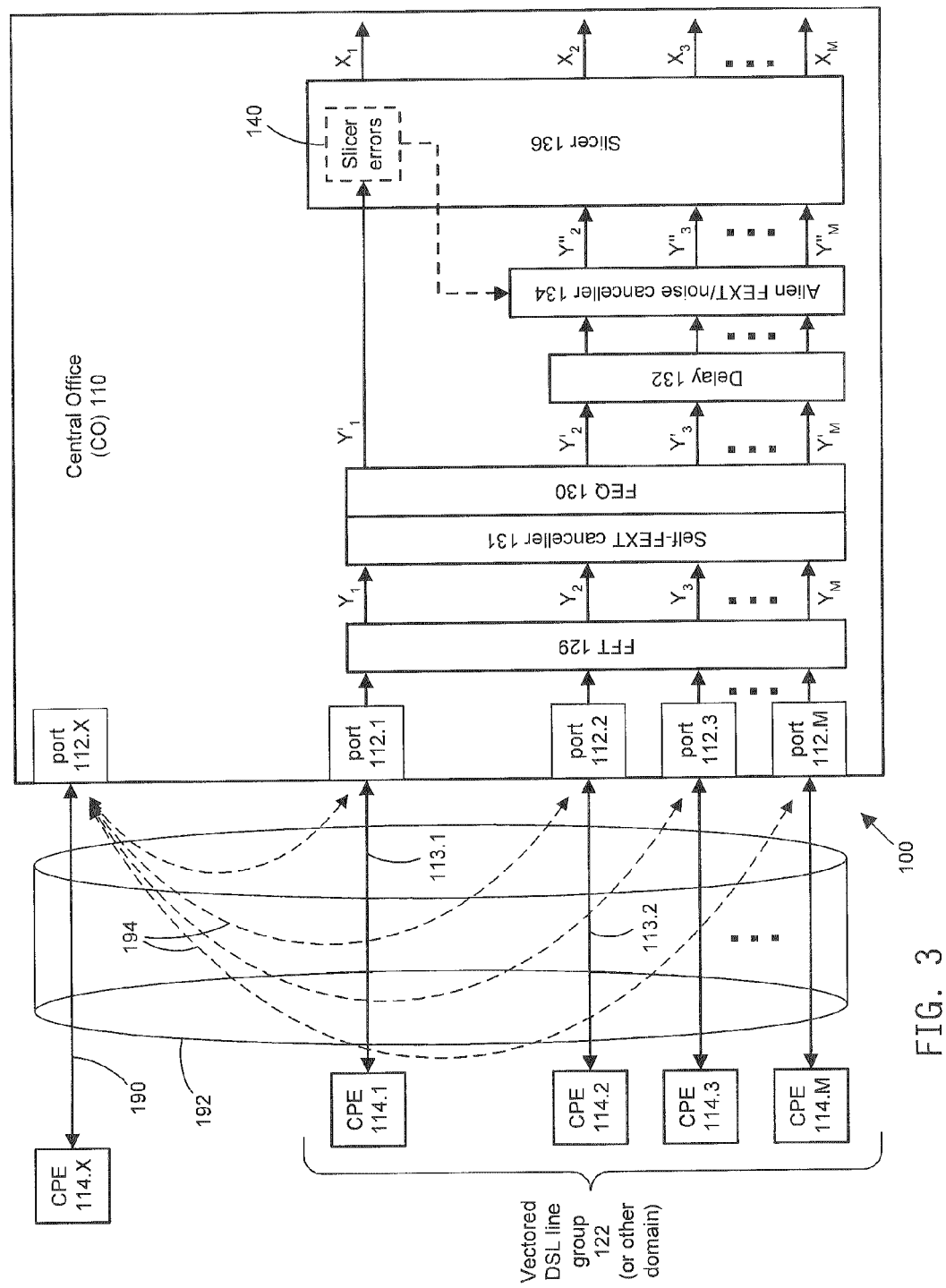

FIG. 2 shows one or more alternate embodiments in which an alien noise reduction system 200 is again implemented using multiple DSL lines 213 in a vectored DSL line group domain 222 impacted by one or more alien noise sources 290. In system 200, however, slicer errors are provided to an alien noise canceller 234 that is an extension of the self-FEXT canceller 231, where both self-FEXT cancellation and alien FEXT cancellation are performed prior to frequency equalization at unit 230. The collected slicer errors are therefore supplied to an inverse FEQ unit 296 prior to being supplied to the alien FEXT canceller 234. Other such equivalents will be apparent to those skilled in the art. For example, FIG. 3 illustrates another embodiment, similar to that of FIG. 1, except that the FEQ unit 130 is in sequence after self-FEXT canceller 131, rather than before the self-FEXT canceller. As will be appreciated by those skilled in the art, other variations are possible without departing from the spirit, scope and teachings of the DSL alien noise reduction embodiments disclosed and claimed herein.

Some "off-chip" vectored DSL systems, such as those using the Ikanos NodeScale™ vectoring technology, utilize DSL line cards to act as upstream-end receiving devices on vectored DSL lines. Rather than processing DSL signals to perform self-FEXT cancellation on the line cards, as was done in earlier systems, the vectoring processing is done off of the line cards, for example on a separate processing chip or other device. DSL signal data is routed from each participating line card to the appropriate DSL vector processor device, which performs self-FEXT cancellation and then returns the processed data to the appropriate line card for further processing. When using such "off-chip" self-FEXT cancellation systems, the FEXT cancellation processing capacity on each line card (referred to as an "on-chip" vectoring control entity (VCE) or the like) typically goes "unused" because it is not needed for self-FEXT cancellation. Some embodiments of alien noise reduction disclosed and claimed herein utilize off-chip processing for self-FEXT cancellation in combination with on-chip (i.e., line card) processing of post-self-FEXT cancellation signal data to cancel alien FEXT and/or other alien noise. One or more examples of such systems can be found in U.S. Ser. No. 12/997,222, filed 9 Jun. 2009, and published as United States Publication No. 2011/0080938 A1, owned by Ikanos Communications, Inc. and entitled Vectored DSL Crosstalk Cancellation, which is incorporated by reference herein in its entirety for all purposes.

Figure 4:
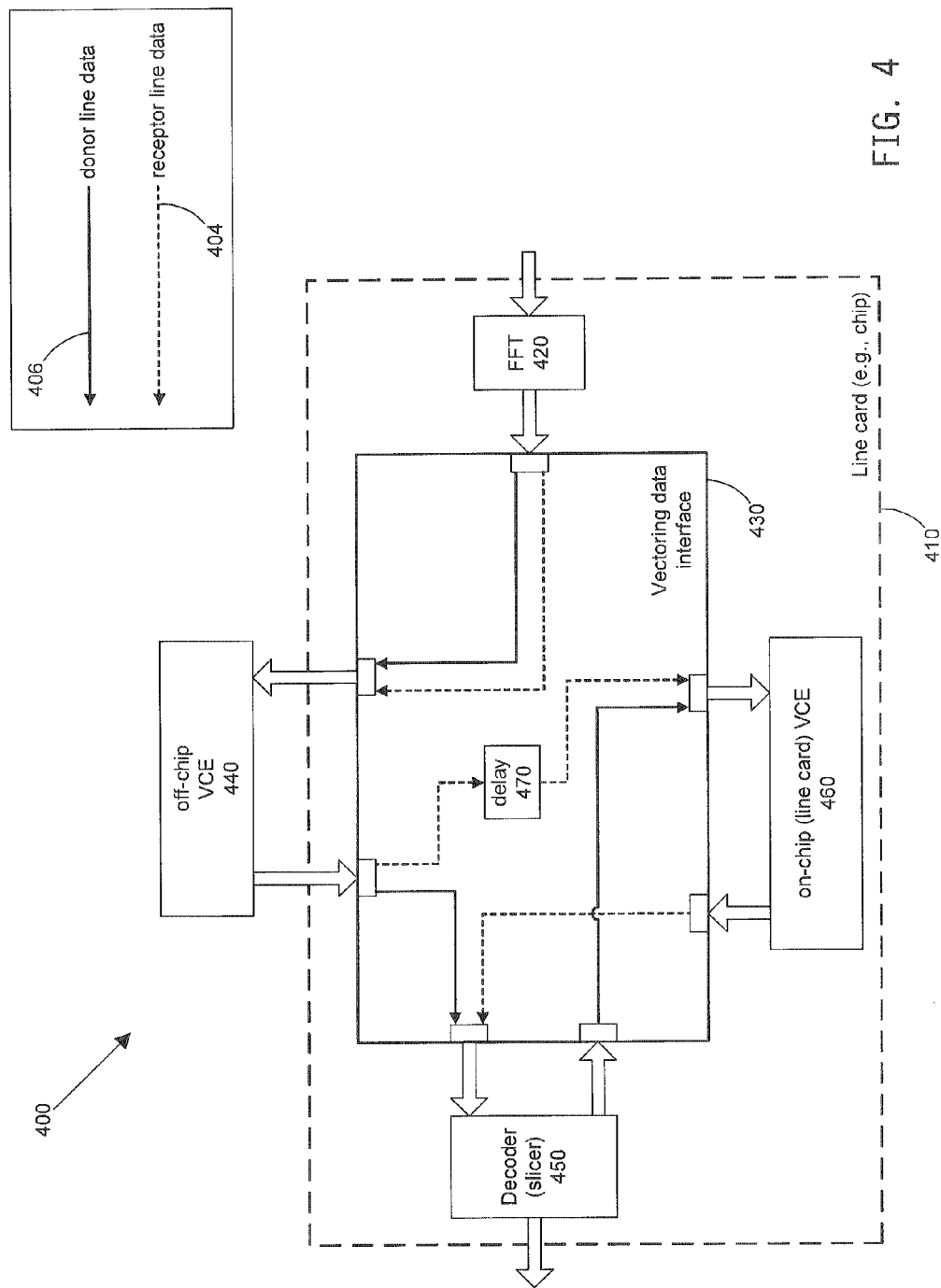

As noted above, embodiments of alien noise reduction hereunder can be implemented in a wide array of apparatus configurations. FIG. 4 illustrates one or more embodiments of alien noise reduction wherein off-chip self-FEXT cancellation is implemented in a vectoring chip or the like. In system 400 data in the form of time domain data signals flow into the FFT unit 420 of line card 410 and are converted to frequency domain data (FEQ processing can be performed as well). Solid lines 406 in FIG. 4 show DSL received data flow for donor DSL lines; dashed lines 404 in FIG. 4 show DSL received data flow for receptor DSL lines. Frequency domain data is sent for both donor DSL lines and receptor DSL lines from FFT unit 420 via a vectoring data interface 430 to an off-chip vectoring control entity 440.

Off-chip VCE 440 performs self-FEXT cancellation for all lines, including any donor DSL lines and receptor DSL lines, and returns the processed donor DSL line data and receptor DSL lines data to vectoring data interface 430; donor DSL line data is sent to the slicer/decoder 450 on line card 410. Slicer errors relating to the donor DSL line signal data are generated by slicer 450 and these slicer errors are sent via vectoring data interface 430 to the on-chip line card VCE 460 to generate cancellation coefficients used in performing alien noise cancellation for receptor DSL line data that has had self-FEXT cancellation performed on off-chip VCE 440.

After self-FEXT cancellation on off-chip VCE 440, 4eceptor DSL line data (shown as dashed lines 404) is then sent to the vectoring data interface 430, is delayed in delay unit 470, then is sent to line card VCE 460 for alien noise cancellation using the cancellation coefficients generated from the donor DSL line slicer errors provided by slicer 450. The alien noise cancellation coefficients generated from the donor DSL line slicer errors are used to perform alien noise cancellation in line card VCE 460 and the receptor DSL line data thus processed is then sent to slicer 450 for constellation decision via vectoring data interface 430.

Using alien noise correlation, embodiments of the present invention cancel alien disturbances from one or more lines in a given vectored DSL system. One or more embodiments of alien noise reduction can be implemented when there are M DSL lines active in a given vectored DSL system (or other defined domain), and K alien noise sources. In such systems the frequency domain signal received at time instant t on tone q of an in-domain line i in the given vectored DSL system is:

$$y_i[q,t] = w_i[q,t] + \sum_{j=1}^{M} h_{i,j}[q,t]x_j[q,t] + \sum_{k=1}^{K} \alpha_{i,k}[q,t]a_k[q,t]$$

where $a_k$ is $k^{th}$ alien noise source and from $\alpha_{i,k}$ is the coupling from $k^{th}$ alien noise source to the line i, $x_j$ is transmit signal on line j and $h_{i,j}$ is from channel from line j to i. For j not equal to i, $h_{i,j}x_j$ is self-FEXT from in-domain line j into in-domain line i, and $w_i$ is additive white noise. This description of K alien noise sources can be simplified for exemplary purposes to a single alien disturber (e.g., a dominant alien noise source). As will be appreciated by those skilled in the art, embodiments of alien noise reduction can thus be readily expanded to the multiple-alien noise source situations (i.e., where K>1). In exemplary embodiments cancelling a single dominant alien source (i.e., where K=1), let a[q,t] be the dominant alien source signal so that:

$$y_i[q,t] = w_i[q,t] + \sum_{j=1}^{M} h_{i,j}[q,t]x_j[q,t] + \alpha_i[q,t]a[q,t]$$

After self-FEXT cancellation and frequency domain equalization (FEQ), the received signal can be represented as:

$$y'_i[q,t] = w'_i[q,t] + x_i[q,t] + \alpha'_i[q,t]a[q,t]$$

For tone q, the slicer errors (when the symbol estimates are reliable enough):

$$e_i[q,t] = \alpha'_i[q,t]a[q,t] + w'_i[q,t]$$

Assuming that the coupling coefficients $\alpha'_i[q,t]$ are stationary in time per tone q, the slicer errors (at synch symbols) are:

$$e_i[q,t] = \alpha'_i[q]a[q,t] + w'_i[q,t]$$

This methodology exploits the correlation in the slicer errors $e_i[q,t]$ of lines impacted by a common dominant alien noise source. The slicer errors from a donor line (which can be, e.g., a sensor port, an active DSL line) terminating at the same chip (as affected lines) are used to cancel the alien noise from the affected lines. Alien noise cancellation for a receptor DSL line i, using slicer errors from a single donor DSL line j is:

$$y'_i[q,t] = y'_i[q,t] - c_{ij}[q]e_j[q,t]$$

where $c_{ij}[q]$ is the alien noise canceller coefficient for receptor i and donor j. The residual noise in the receptor line signal is then:

$$e'_i[t] = e_i[t] - c_{ij}[q]e_j[q,t]$$

Canceller Coefficients Initialization Embodiments—

After the self-FEXT and alien noise cancellation, the signal to noise ratio (SNR) at tone q of line i over T DMT symbols is:

$$SNR_i[q] = \frac{\sum_{t=1}^{T} x_i[q,t]x_i^*[q,t]}{\sum_{t=1}^{T} e'_i[q,t]e_i'^*[q,t]}$$

In above expression and discussion following, the complex conjugate operation is represented as, *. Calculating the canceller coefficients, from donor DSL line j to receptor DSL line i, which maximize the receptor DSL line SNR, involves the solutions for canceller $c_{ij}$ (trained on synch symbols), minimizing the residual noise power:

$$\min_{c_{ij}[q]} (e_i[q, t] - c_{ij}[q]e_j[q, t])^2$$

The receptor DSL lines SNR maximizing alien canceller is computed from the slicer errors of the T training symbols (the DMT symbols transmitted for receiver training) of the receptor DSL line i and donor DSL line j as $$c_{ij}[q] = \frac{\sum_{t=1}^{T} e_i[q, t] \cdot e_j^*[q, t]}{\sum_{t=1}^{T} e_j[q, t] \cdot e_j^*[q, t]}$$

Similarly, the initial estimates of the alien noise canceller coefficients for other possible combinations of the donor and receptor lines, terminating on the same chip (CO card) are computed.

Donor and Receptor DSL Line Selection/Segregation Embodiments—

At tone q, $c_{ij}[q]$ is the estimated the alien noise canceller from donor line j to receptor line i, at time instant t, after the alien noise cancellation using the donor line slicer errors, $e_j[q,t]$, the residual error of receptor line j is $e'_i[q,t]=(e_i[q,t]-c_{ij}[q]e_j[q,t])$.

One or more methods for selecting donor and receptors lines are based on maximizing the average SNR, after the alien noise cancellation, of the 1 ... Q data carrying tones of the receptor lines, given by:

$$SNR_i(j) = \frac{1}{Q} \sum_{q=1}^{Q} \frac{\sum_{t=1}^{T} x_i[q, t]x_i^*[q, t]}{\sum_{t=1}^{T} (e_i[q, t] - c_{ij}[q]e_j[q, t])(e_i[q, t] - c_{ij}[q]e_j[q, t])^*}$$

$x_i[q,t]$ is the slicer output of the receptor line data at tone q and instant t. In case of a single donor and receptor DSL line, pair are selected as $$\underset{(i,j)}{\mathrm{argmax}} SNR_i(j).$$

In the case of multiple donors the method is generalized with adding more alien cancellation terms $-c_{ij}[q]e_j[q,t]$, from other donors, in the receptor slicer errors, where i's and j's are from the separate set of lines terminating at the same chip.

In other methods of donor and receptor selection, the per tone SNR of the receptor lines may be converted into data carrying capacity (bits) of the tones and a similar method for maximizing the overall bit carrying capacity of the DSL lines, is derived. The donor and receptor line selection can also depend on the provisioned data rate and supported data rate of the DSL lines in consideration.

Implementation of Alien Noise Canceller Embodiments—

After the alien canceller initialization and donor and receptor line selection, the alien canceller is engaged. For each received DMT symbol, the donor line data is processed first and the per tone slicer errors of the donor DSL lines (e.g., $e_j[q,t]$ for tone q, symbol t, donor line j) are sent to the alien canceller. At the alien canceller, each donor's contribution for the alien noise corrections, $-c_{ij}[q]e_j[q,t]$, are added to the received frequency domain signals of the receptor lines, where $c_{ij}[q]$ is alien canceller from donor j to receptor i for tone q. In the case of more than one donor, similar terms for other donors are added. After alien noise cancellation, receptor lines signals are sent to the demodulator for further processing.

As noted above, alien noise cancellation can be implemented before or after the frequency domain equalization (FEQ). In embodiments implementing alien cancellation before FEQ, proper scaling of slicer errors of the donor lines and alien canceller should be taken care, to match receptor signal level.

Alien Noise Canceller Coefficient Updating Embodiments—

To track variations in the alien canceller coefficients, a stochastic gradient method for updating coefficients, based on the correlation in the slicer errors of the receptor line after the alien cancellation and the donor line slicer errors, is used in some embodiments, for tone q, receptor line i and donor line i the updated alien canceller coefficient at instant t is:

$$c_{ij}[q](t+1)=c_{ij}[q](t)+\lambda e'_i[q,t]\cdot e_j^*[q,t]$$

In the above expression $\lambda$ is the updating coefficient.

Using dynamic spectrum management level 3 (DSM3) and crosstalk modeling (which typically is represented as a matrix containing coefficients representing the various vectored DSL line crosstalk relationships determined during training, tracking and the like), transmit pre-compensation (e.g., precoding) can be used to cancel self-FEXT in the downstream direction (from DSLAM to customer site). In the upstream direction (from downstream-end customer site to upstream-end DSLAM), MIMO (multiple-input-multiple-output) spatial filtering is used at the DSLAM to cancel upstream self-FEXT at the upstream receive side. Generally, a crosstalk canceller performs compensation at an upstream-end DSL device (e.g., a DSLAM, a line card, an optical networking unit, receiver, etc.) for undesired self-FEXT on subscriber lines in the vectored group. Cancellation is performed using a matrix operation that receives data samples (e.g., FFT outputs or FEQ outputs) and outputs compensated data for input to an FEQ or constellation demapper, thus cancelling vectored group self-FEXT.

Figure 5:
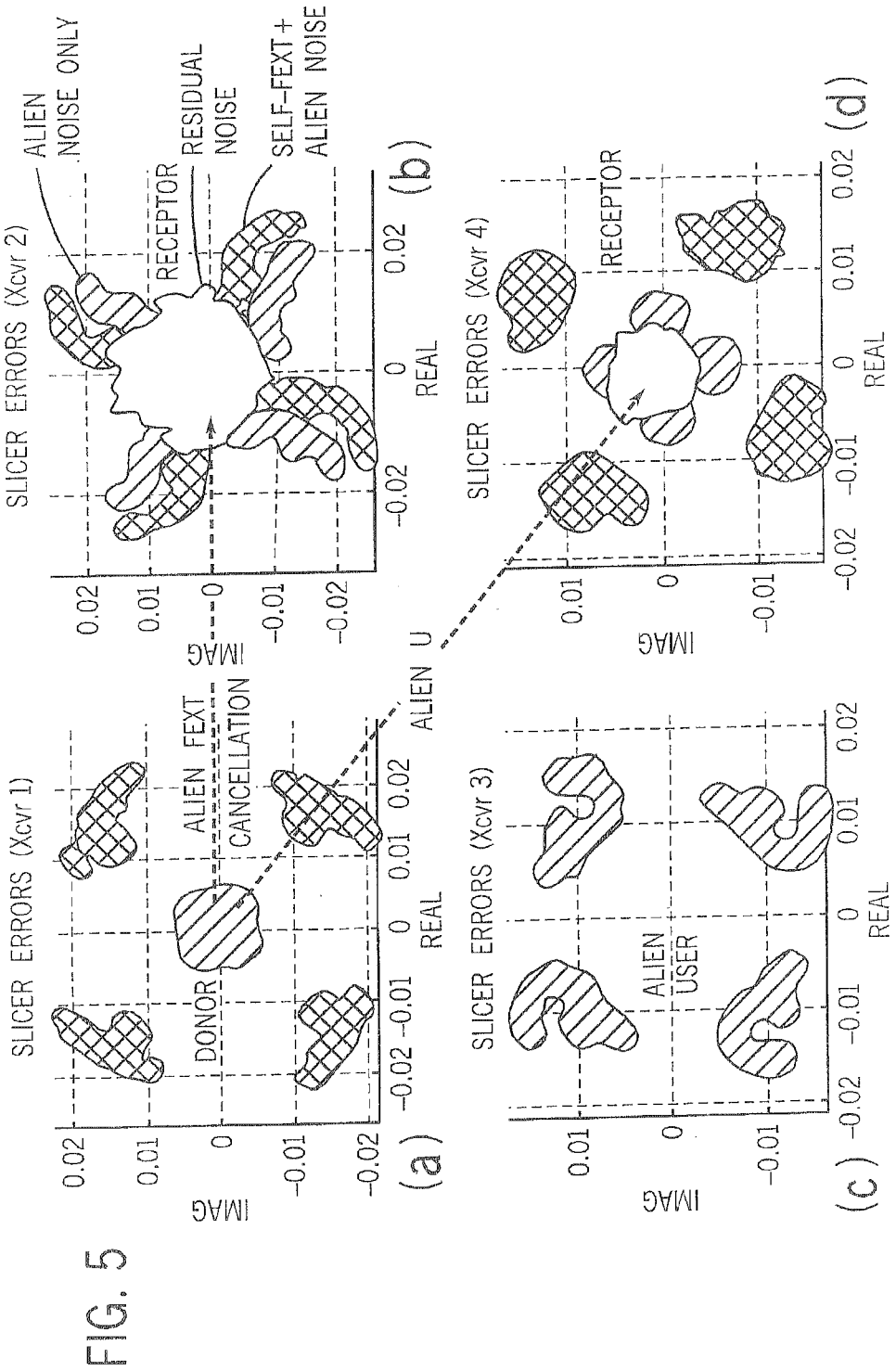
Figures 7A, 7B, 7C, 7D, 7E:
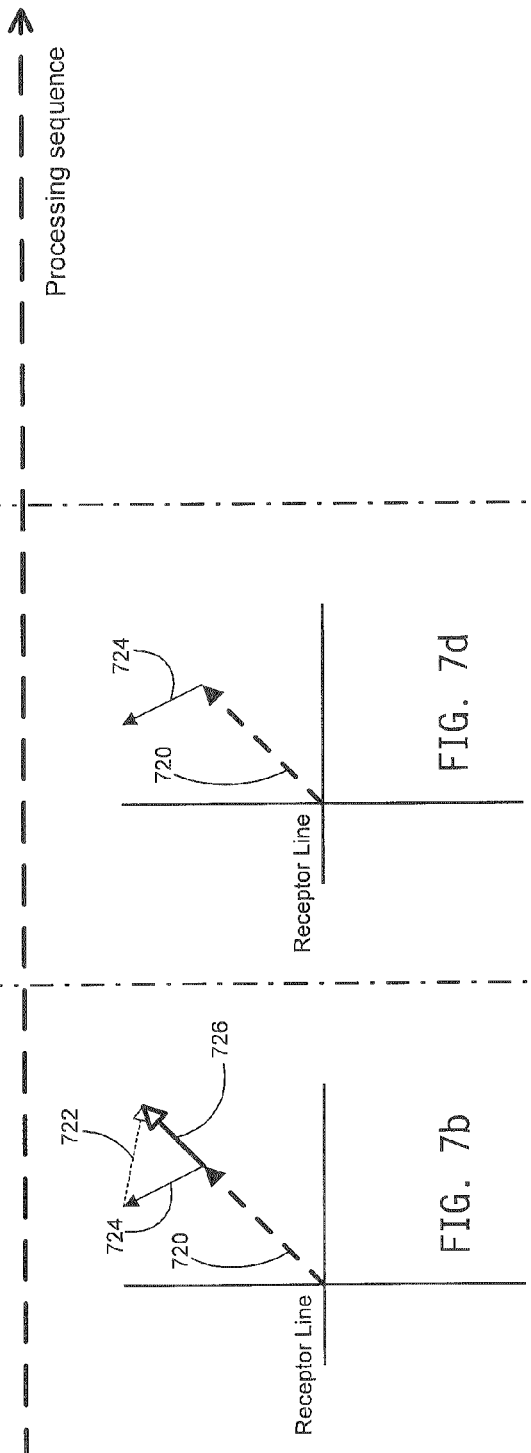

As seen in the exemplary plots and diagrams (including SNR plots) of FIGS. 5 and 6, signals on one or more active reliable lines (high SNR lines) are demodulated/sliced and the error from the demodulator/slicer of these lines are used to mitigate the impact of alien disturber from not so reliable lines (comparatively lower SNR lines). Further exemplary signal constellation diagrams are shown in FIGS. 7 and 8. A received signal 710 on a donor DSL line is distorted by self-FEXT noise 712 and alien noise 714 to generate a resultant noise 716, as seen in FIG. 7a. A receptor DSL line's received signal 720, shown in FIG. 7b, likewise is distorted by self-FEXT noise 722 and alien noise 724, resulting in noise 726. The results of self-FEXT cancellation performed with regard to the donor DSL line are shown in FIG. 7c, wherein received signal 710 is still distorted by alien noise 714 (but self-FEXT noise 712 has been removed). Similarly, FIG. 7d shows that receptor DSL line received signal 720 is only distorted by alien noise 724 after the effects of self-FEXT noise 722 have been removed. FIG. 7e shows the slicer error 718 generated on the basis of the alien noise 714 remaining when received signal 710 is removed. This slicer error 718 can then be used, as shown in the embodiment(s) of FIG. 8, to perform alien noise cancellation for the receptor DSL line.

FIG. 8a shows that the slicer error 718 can be multiplied by a calculated canceller coefficient 820 to generate a correction 822. This correction 822 is then added to receptor DSL line's received signal 720 and alien noise 724. Correction 822 cancels alien noise 724, leaving received signal 720, the effects of self-FEXT and alien noise both being removed using embodiments of alien noise reduction disclosed and claimed herein.

Figure 9:
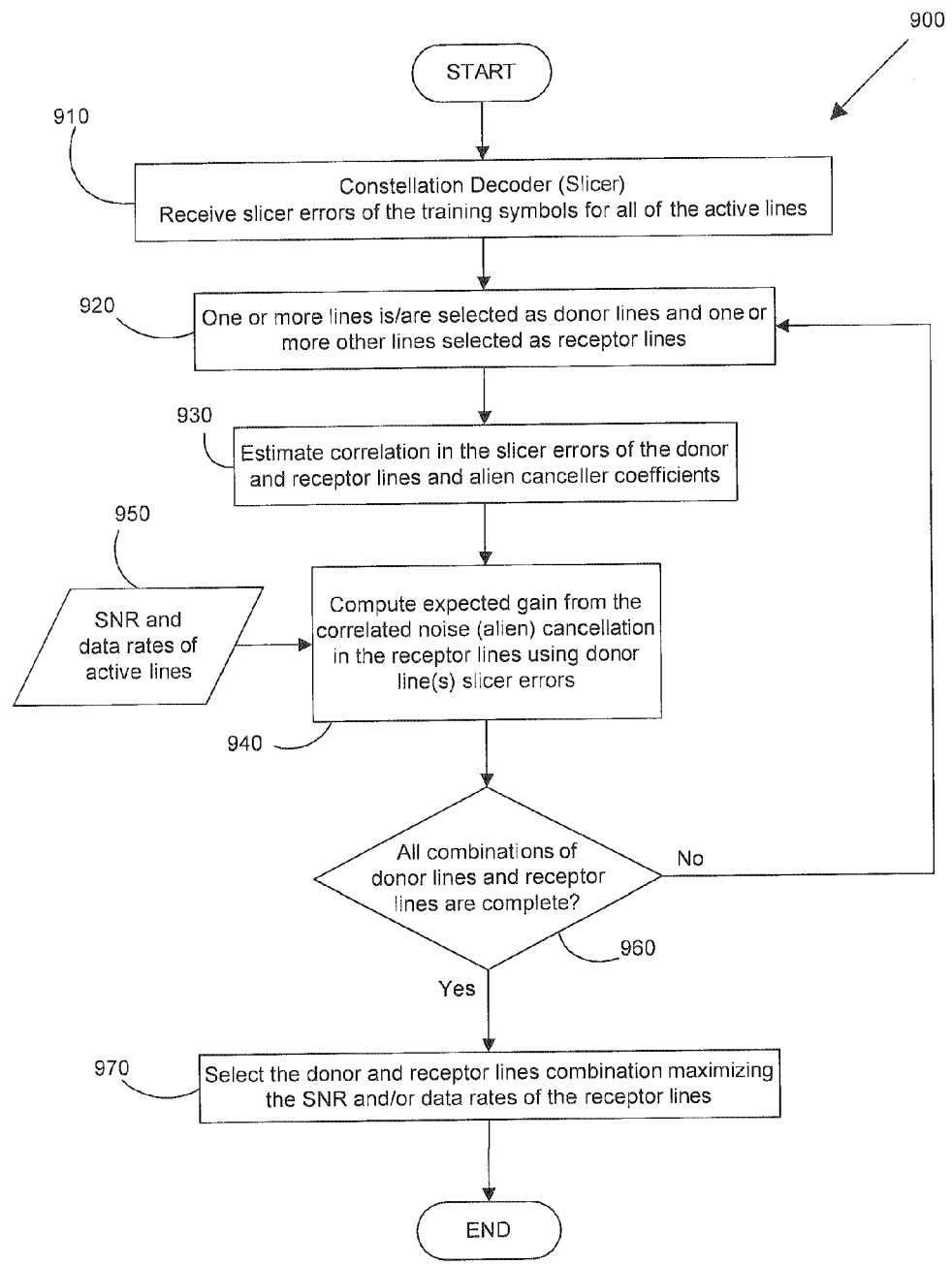
FIGS. 9-11 are flow diagrams of one or more methods implementing one or more embodiments of alien noise reduction.

FIG. 9 illustrates one or more embodiments of alien noise reduction, showing a process 900 in which a constellation decoder (slicer) generates or provides at 910 for collection slicer errors of the training symbols for all active lines in a given domain. At 920 one or more lines are then selected as donor DSL lines and one or more other lines are selected as receptor DSL lines. The correlation in the slicer errors for both the selected donor DSL lines and the selected receptor DSL lines, and the alien canceller coefficients, are then estimated at 930. Expected gains can then be calculated at 940 using suitable data (e.g., SNR data, active lines' data rates, etc.) at 950. A decision is then made at 960 as to whether all (or a sufficient number) of combinations of donor DSL lines and receptor DSL lines have been considered and completed. If not, then the process continues at 920 with a new donor DSL line/receptor DSL line combination. If a sufficient number of combinations have been considered, then a selection of donor DSL line(s) and receptor DSL line(s) is made at 970, for example based on maximizing the SNR, one or more data rates, etc.

Figure 10:
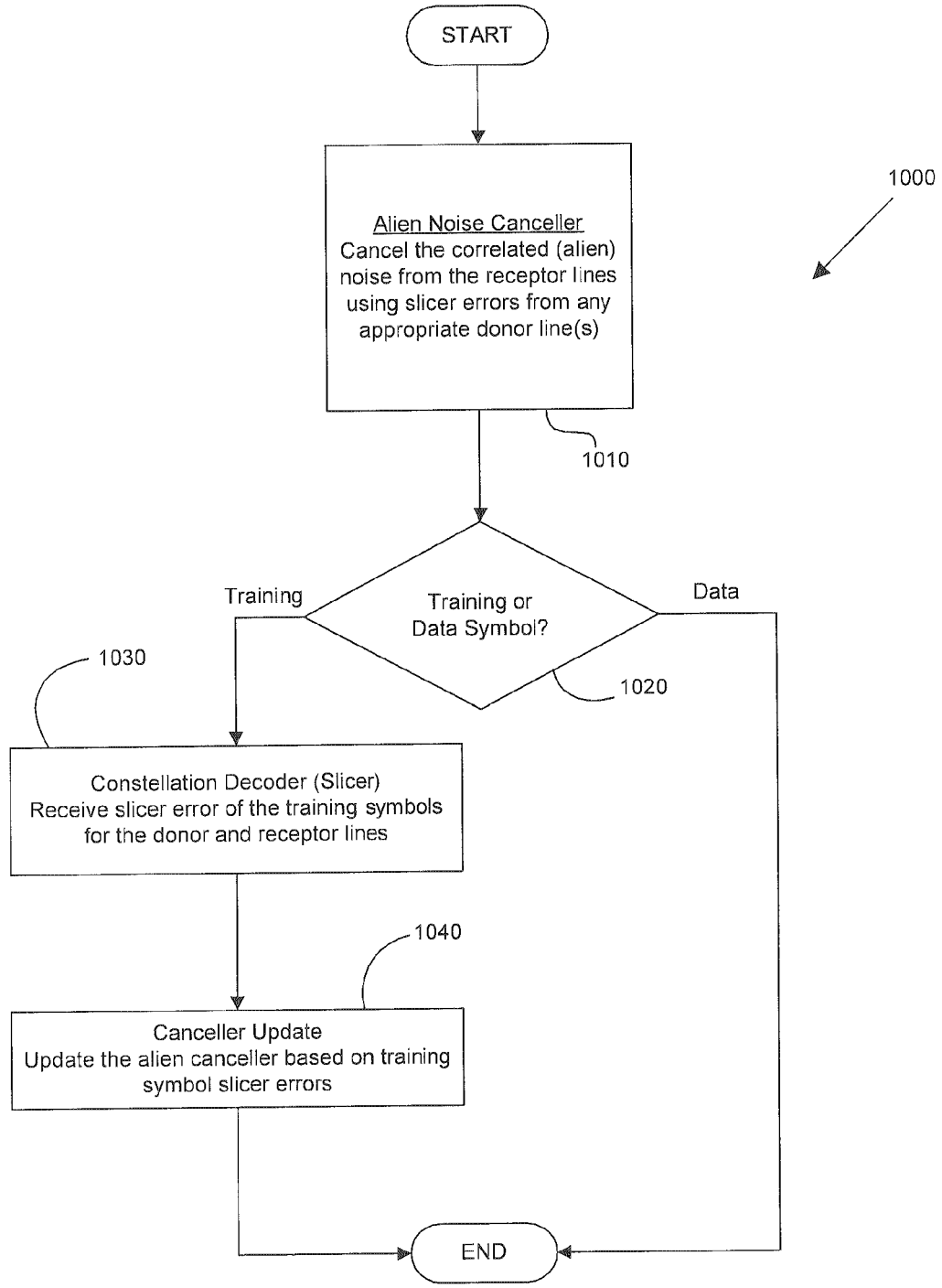

Another embodiment of alien noise reduction is illustrated in FIG. 10, illustrating a process 1000 in which an alien noise canceller cancels correlated alien noise at 1040 from receptor DSL lines using slicer errors from any appropriate donor DSL line(s). A decision 1020 is then made as to whether the received data is training data or a data symbol. When training data is received, then at 1030 a constellation decoder (slicer) generates or provides the slicer errors of the training symbols for the donor and receptor lines. Thereafter the canceller is updated at 1040 based on the training symbol slicer errors.

Figure 11:
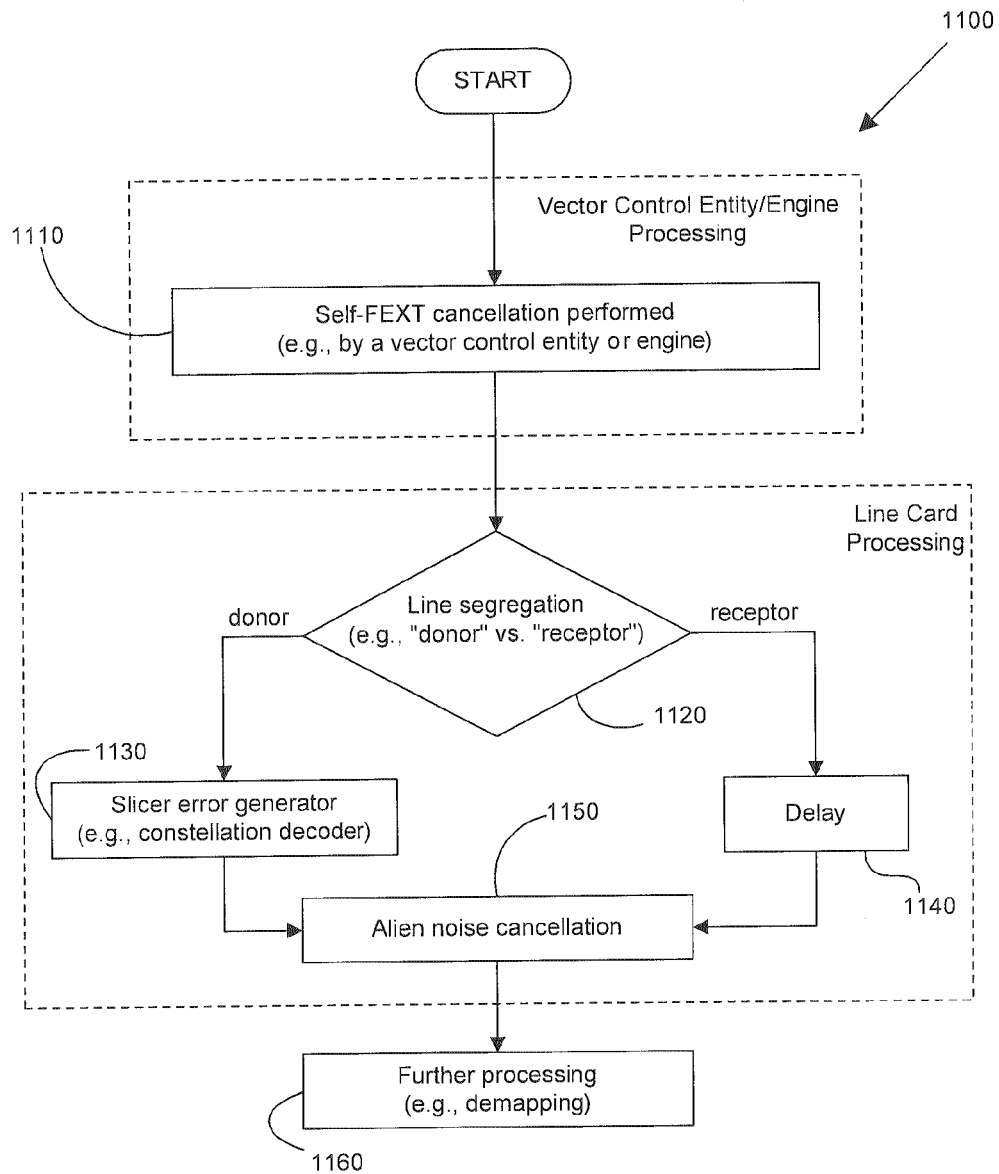

FIG. 11 illustrates one or more embodiments of alien FEXT reduction. A method 1100 begins at 1110 with self-FEXT cancellation taking place (in this embodiment the self-FEXT cancellation is performed "off" of the line card chip, e.g., being performed by a vector control entity or engine on a separate vectoring card, chip or the like). That is, received signals at an upstream-end CO ports on one or more line cards (or the like) can be processed using Fast Fourier Transform (FFT) units in each line card, after which the signal data can be sent for vectoring (in some cases frequency equalization by an FEQ unit is performed on the line card prior to further processing by a vectoring control entity or the like).

After self-FEXT cancellation at 1110, the processed data is sent back to the appropriate line card and line segregation takes place. At 1120 the DSL line data designated as donor DSL line data are sent to slicer error generator 1130 while the data from DSL lines designated as receptor DSL lines are delayed at 1140 for the duration of the processing time at 1130 (a given DSL line cannot be both a donor DSL line and a receptor DSL line). Donor DSL line signals are sent to a slicer at 1130 to generate slicer errors representative of alien FEXT data and/or other alien noise data that can be used to generate and/or update cancellation coefficients for alien noise cancellation. Receptor DSL line signals are delayed at 1140 (for embodiments similar to that shown in FIG. 1) to allow for the generation of slicer errors at 1130. The receptor DSL line signals and generated slicer errors are then processed together at 1150 to cancel (i.e., reduce or eliminate) alien noise. Any further processing 1160 can be performed thereafter either on the line card or in other locations in the system.

As will be appreciated from the foregoing, various approaches to alien noise cancellation using donor DSL lines can provide significantly improved performance for vectored DSL systems (and other domain-based DSL systems) in which self-FEXT cancellation followed by alien noise cancellation lead to improved performance. Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. A method for performing alien noise reduction, the method comprising:
   receiving DSL data from the upstream ends of a plurality of DSL lines coupled to a line card set in a central office (CO), the line card set comprising one or more DSL line cards;
   converting the received DSL data to frequency domain DSL data in the line card set;
   transmitting the frequency domain DSL data from the line card set to a vectoring chip set comprising one or more DSL vectoring chips;
   generating vectoring chip data by performing self far-end crosstalk (self-FEXT) cancellation on the frequency domain DSL data in the vectoring chip set for an active DSL line group comprising the plurality of DSL lines, the active DSL line group comprising distinct DSL line sets comprising:
      a donor DSL line set comprising one or more donor DSL lines; and
      a receptor DSL line set comprising one or more receptor DSL lines;
   transmitting the vectoring chip data to the line card set;
   generating slicer errors in the line card set for the donor DSL line set vectoring chip data; and
   performing alien noise reduction in the line card set on the receptor DSL line set vectoring chip data using the generated slicer errors.

2. The method of claim 1 wherein the active DSL line set is a vectored DSL group.

3. The method of claim 2 further comprising performing frequency equalization in the line card set on the frequency domain DSL data.

4. The method of claim 2 further comprising performing frequency equalization on the vectoring chip data in the line card set.

5. The method of claim 2 further comprising performing frequency equalization after performing alien noise reduction.

6. A DSL system comprising:
   a plurality of DSL lines coupled to a line card set in a central office (CO), the line card set comprising one or more DSL line cards configured to receive DSL data from the plurality of DSL lines and to convert the received DSL data to frequency domain data, wherein the plurality of DSL lines comprises distinct DSL line sets comprising:
  a donor DSL line set comprising one or more donor DSL lines; and
  a receptor DSL line set comprising one or more receptor DSL lines;
a vectoring chip set coupled to the line card set and comprising one or more DSL vectoring chips configured to perform self far-end crosstalk (self-FEXT) cancellation on the frequency domain DSL data to generate vectored DSL data;
wherein the line card set is further configured to generate slicer errors for the donor DSL line set vectored DSL data and to perform alien noise reduction on the receptor DSL line set vectored DSL data using the generated slicer errors.

7. The DSL system of claim 6 wherein the plurality of DSL lines is a vectored DSL group.

8. The DSL system of claim 6 wherein the plurality of DSL lines is a vectored DSL group comprising the receptor DSL line set.

9. The DSL system of claim 8 wherein the vectored DSL group further comprises the donor DSL line set.

10. A method for performing alien noise cancellation in a DSL system domain comprising a plurality of DSL lines, the method comprising:
  collecting donor DSL signal data from each donor DSL line in a donor DSL line set comprising one or more donor DSL lines;
  collecting receptor DSL signal data from each receptor DSL line in a receptor DSL line set comprising one or more receptor DSL lines in the domain;
  performing self far-end crosstalk (self-FEXT) cancellation on the receptor DSL signal data using one or more of the following: collected donor DSL signal data; collected receptor DSL signal data;
  generating slicer errors based on the donor DSL signal data; and
  performing alien noise cancellation on the receptor DSL signal data using the generated slicer errors.

11. The method of claim 10 wherein the one or more donor DSL lines are in the domain.

12. The method of claim 10 further wherein the donor DSL line signal data and the receptor DSL line signal data are collected at upstream-end ports for all donor DSL lines and receptor DSL lines, respectively.

13. The method of claim 12 wherein the domain is a vectored DSL group.

14. The method of claim 13 further comprising performing correlation between alien noise impacting the donor DSL line signal data and the receptor DSL line signal data.

15. The method of claim 10 wherein the receptor DSL line signal data is delayed during generation of the slicer errors.

16. The method of claim 10 further comprising performing an inverse frequency equalization on the slicer errors before performing alien noise cancellation on the receptor DSL line signal data.

17. The method of claim 13 wherein the alien noise comprises alien FEXT.

18. The method of claim 1 wherein generating slicer errors is performed using training symbols.

19. The DSL system of claim 6, wherein the line card set is configured to generate the slicer errors using training symbols.

20. The method of claim 10 wherein generating slicer errors is performed using training symbols.

* * * * *

UNITED STATES PATENT AND TRADEMARK OFFICE
CERTIFICATE OF CORRECTION

PATENT NO.        : 8,848,504 B2                                Page 1 of 1
APPLICATION NO.   : 13/273916
DATED             : September 30, 2014
INVENTOR(S)       : Singh et al.

It is certified that error appears in the above-identified patent and that said Letters Patent is hereby corrected as shown below:

In the Specification

In Column 6, Line 47, delete "$y'_i[q,t] = y'_i[q,t] - c_{ij}[q]e_j[q,t]$" and insert -- $y''_i[q,t] = y'_i[q,t] - c_{ij}[q]e_j[q,t]$ --, therefor.

In Column 6, Lines 60-64, delete "$SNR_i[q] = \dfrac{\sum_{t=1}^{T} x_i[q,t]x_i^*[q,t]}{\sum_{t=1}^{T} e'_i[q,t]e'^*_i[q,t]}$" and insert -- $SNR_i[q] = \dfrac{\sum_{t=1}^{T} x_i[q,t]x_i^*[q,t]}{\sum_{t=1}^{T} e'_i[q,t]e'^*_i[q,t]}$ --, therefor.

Signed and Sealed this
Third Day of February, 2015

Michelle K. Lee
*Deputy Director of the United States Patent and Trademark Office*